United States Patent [19]

Denslow

[11] Patent Number: 5,548,721
[45] Date of Patent: Aug. 20, 1996

[54] METHOD OF CONDUCTING SECURE OPERATIONS ON AN UNCONTROLLED NETWORK

[75] Inventor: David L. Denslow, Rochester, N.Y.

[73] Assignee: Harris Corporation, Melbourne, Fla.

[21] Appl. No.: 234,947

[22] Filed: Apr. 28, 1994

[51] Int. Cl.$^6$ ........................................ G06F 11/34
[52] U.S. Cl. ........................ 395/187.01; 380/23
[58] Field of Search .................. 395/186, 187.01, 395/188.01; 380/21, 24, 23, 25, 30

[56] References Cited

U.S. PATENT DOCUMENTS

| | | | |
|---|---|---|---|
| 4,649,233 | 3/1987 | Bass et al. | 380/21 |
| 4,665,396 | 5/1987 | Dielema | 380/23 |
| 4,850,017 | 7/1989 | Matyas, Jr. et al. | |
| 4,924,513 | 5/1990 | Herbison et al. | |
| 4,965,568 | 10/1990 | Atalla et al. | |
| 5,103,478 | 4/1992 | Matyas et al. | 380/25 |
| 5,196,840 | 3/1993 | Leith et al. | 380/21 |
| 5,241,594 | 8/1993 | Kung | 380/4 |
| 5,253,295 | 10/1993 | Saada et al. | |
| 5,256,863 | 10/1993 | Fergusan et al. | 235/383 |
| 5,272,754 | 12/1993 | Boerbert | 380/25 |
| 5,329,623 | 7/1994 | Smith et al. | 395/200 |
| 5,363,707 | 11/1994 | Follendore, III | 380/25 |
| 5,371,797 | 12/1994 | Bocinsky, Jr. | 380/24 |

Primary Examiner—Robert W. Beausoliel, Jr.
Assistant Examiner—Albert Decady
Attorney, Agent, or Firm—Rogers and Killeen

[57] ABSTRACT

A method of conducting secure operations on an uncontrolled network in which authorized users are provided with a personal identifier and with a portable, electronically readable card with part of a system key thereon. The system key is created by a secure network access port (SNAP) at the workstation, and, when used in combination with the persona identifier, uniquely identifies the user so that the card and identifier may be used to conduct secure operations from any workstation in the network. Operational keys for conducting the secure operations are provided from a network security manager to a workstation in response to a validated request for access. The operational keys are provided in an encrypted communication using an initialization key unique to the workstation and known to the manager.

11 Claims, 1 Drawing Sheet

METHOD OF CONDUCTING SECURE OPERATIONS ON AN UNCONTROLLED NETWORK

BACKGROUND OF THE INVENTION

The present invention relates to methods of communicating among secure computer workstations in an uncontrolled network. More particularly, the invention relates to a method of conducting secure operations from computer workstations that are connected to an uncontrolled network in which a user can communicate from the user's home workstation or from another workstation by using an unsecure portable card.

An uncontrolled network is one that is not secure. That is, there is no control over who is on or listening to the communications on the network. A secure computer workstation is a computer terminal or communications device in which access to the workstation, to parts thereof, or to information therein is limited and achieved only by completing a prescribed set of security procedures. The workstation may also be able to provide unsecure operation (that is, anyone may be able to use the unsecure parts or information at the workstation). Typically, a key is used to conduct secure operations from the workstation. A key is a set of data (e.g., numbers, letters, symbols) that is desirably unique and may be randomly generated. Secure operations may be conducted when a user provides the proper key and may include, without limitation, using the secure computer workstation alone, communicating with other secure workstations on the network, and communicating secure information among workstations on the network.

One of the problems with conducting secure operations in an uncontrolled network is that when secure information is communicated on the network, it can be heard by anyone on the network and thus must be encrypted. Devices for encrypting and decrypting are well known and are operated by keys that enable the encrypting and decrypting devices. Secure operations between workstations will only work when each communicating entity has the same key, and the key must be distributed to each entity without compromising its security.

There are various methods for distributing keys, but none have proven satisfactory for uncontrolled computer networks (e.g., a local area network) for various reasons. For example, the size and/or dispersion of a computer network may make periodic hand distribution of the keys expensive or unduly cumbersome. Permanent keys (those that are not changed periodically) may not meet security requirements.

One solution is to distribute the keys through the network communications medium. However, this method requires that the keys are encrypted before they are distributed and that the user to whom the keys are being delivered is authorized to receive them. The paired problems of secure distribution of the keys and ascertaining the authority of the recipient make their solution far more complex than may be found in a typical automated bank teller operation, for example.

Another problem encountered by users of secure workstations is obtaining clearance to conduct secure operations on the network from a remote workstation. This problem may be encountered when a user wants to access secure information at his home workstation from a remote workstation. (A user's home workstation is the workstation that the user normally uses.)

Accordingly, it is an object of the present invention to provide a novel method for conducting secure operations on an uncontrolled network.

It is another object of the present invention to provide a novel method for conducting secure operations from computer workstations that are connected to an uncontrolled network in which a user can communicate from a workstation by using an unsecure portable card.

It is a further object of the present invention to provide a novel method for conducting secure operations on an uncontrolled network in which a user can communicate from the user's home workstation or from another workstation by using an unsecure portable card and secure personal identifier.

These and many other objects and advantages of the present invention will be readily apparent to one skilled in the art to which the invention pertains from a perusal of the claims, the appended drawings, and the following detailed description of preferred embodiments.

DESCRIPTION OF PREFERRED EMBODIMENTS

Figure 1:
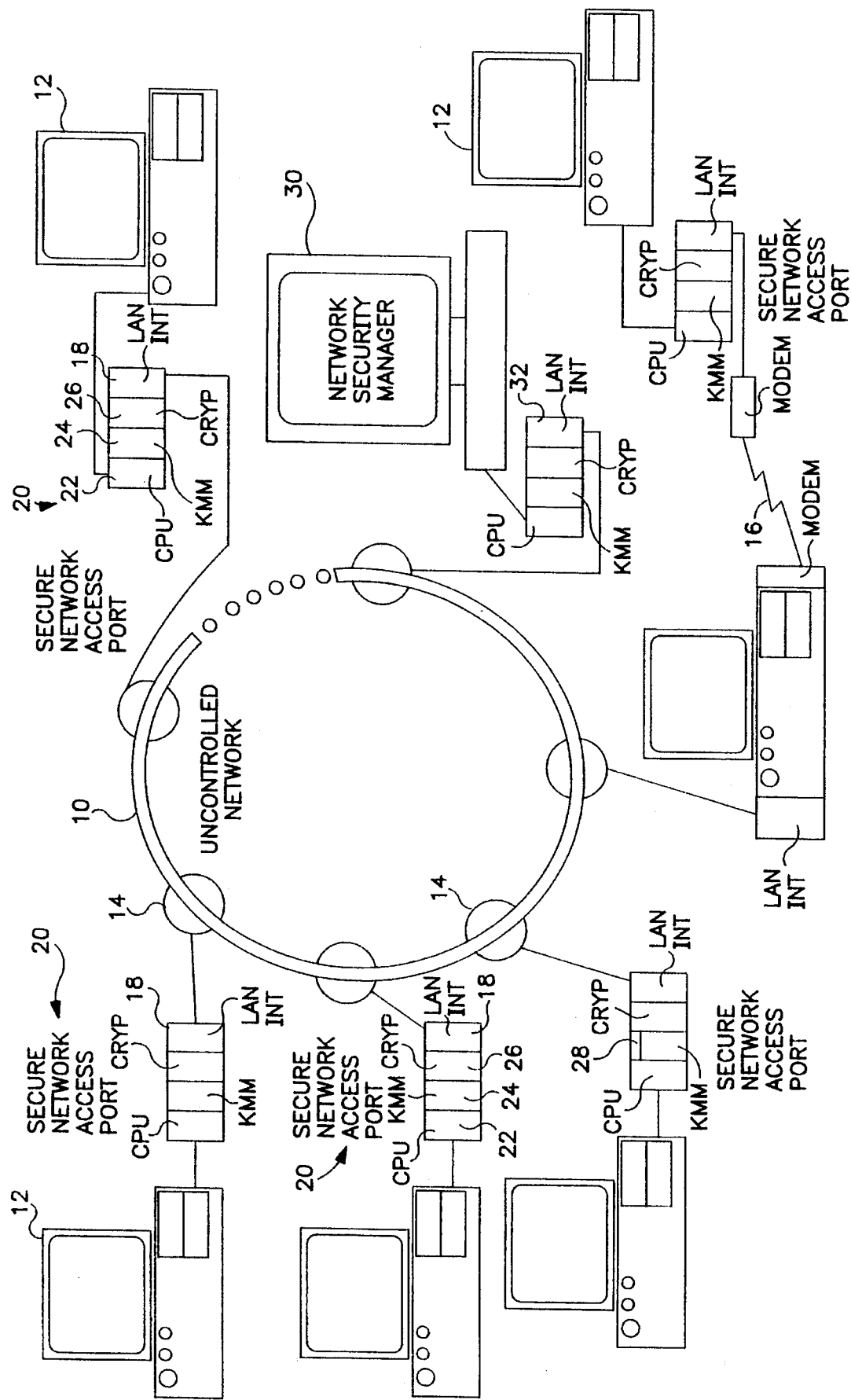
FIG. 1 is a schematic diagram of an embodiment of a system of the present invention.

Hardware. With reference to FIG. 1, a preferred embodiment of the present invention may find application in a computer network with a network communications medium 10 to which plural computer workstations 12 are operably connected.

The communication medium 10 may be any suitable network communication link, including those that are wire connected and those that are wireless. The medium 10 need not be controlled (e.g., it may be unsecure). In a preferred embodiment, the medium 10 is an uncontrolled local area network (LAN) in a ring configuration, although this is not required for the present invention. Signal priority may be established using conventional techniques as the present invention is transparent to the technique selected.

The computer workstations 12 may be any suitable computer terminals that are operably connected to the medium 10 directly through conventional connections 14 or indirectly, such as exemplified by the modem link 16 through another computer. The workstations 12 may also be able to provide unsecure operations. Each workstation 12 is connected to the medium 10 through an appropriate interface, such as LAN interface 18.

Each workstation 12 that will be used to conduct secure operations is provided with a secure network access port (hereinafter "SNAP") 20. The SNAP 20 is the interface between the workstation 12 and the network 10 that enables secure operation on an unsecure communications medium 10. Preferably each SNAP is equipped with a computer processing unit (CPU) 22 for providing administrative instructions to the workstation 12 and the LAN interface 18 and for providing processing support, a key management module 24 (KMM, also SKMM for standard key management module) for creating, storing, retrieving, and managing operation of the various keys that are used, and a crypto module 26 that may be any conventional encryption/decryption device. The LAN interface 18 optionally may be part of the SNAP 20. The KMM 24 desirably is provided with a back-up source of electrical power, such as a battery. The functions of the CPU 22 and KMM 24 may be combined into a single processor that may include or have access to data storage capability. The crypto module 26 may be a separate module whose physical security is tightly controlled, although this is not required where not mandated by the security level.

A personal identifier is established for each user of the system. Each user is responsible for the security of their own personal identifier. Each personal identifier is also provided to the network security manager (discussed below). The personal identifier may uniquely identify the user (e.g., finger, voice, retina prints) or may be a group of symbols that is less than unique (e.g., a multi-digit personal identification number (PIN) or group of letters) and used in conjunction with another identifier to uniquely identify the user. If the personal identifier is not a group of symbols that can be encrypted (such as a fingerprint) the identifier may be translated into a group of symbols using available techniques.

Each user of the system is also provided with a portable card with data storage capability, such as a conventional plastic card with a readable strip of data storage material thereon. The card, referred to herein as a crypto ignition key (CIK) card, may include devices for indicating whether the information stored on the CIK card has been altered or read by an unauthorized user. As will be discussed below, the CIK card will be provided with part of a key that may be used with the personal identifier to uniquely identify a user and that is used to initiate procedures for conducting secure operations on the network. The CIK card may also be provided with network specific information to indicate in which network the card is to be used, and/or other security information to indicate that the card is valid.

The SNAP may include a reader 28 for reading the CIK card. The reader 28 may be a separate module or may be part of the any of the other SNAP modules, such as the KMM 24. The reader 28 may be conventional and correspond to the CIK card selected for use with the system.

The system may also be provided with a network security manager 30 that may be a workstation or other network management device dedicated to the functions of the manager 30, or may be another workstation 12 in which part of the workstation is dedicated to management functions. The manager 30 authorizes access to the secure network by authenticating access requests. To this end, it may be provided with a network port 32 that is the same or similar to SNAP 20, or at least compatible therewith. The operation of the manager 30 may be automated so that human intervention is not required, although this is not required.

The manager 30 maintains files on each authorized user including the personal identifier and the information on the CIK card (discussed in more detail below). It also stores the keys (or copies thereof) used in the network, and may create keys as permitted under the operable security procedures.

Operation. Operation of the invention may be better understood by separating the method into three parts that will be discussed in sequence below: the user's initial authorization to conduct secure operations on the network, a secure session at the user's home workstation, and a secure session at a workstation that is not the user's home workstation.

initial authorization to conduct secure operations on the network is commenced by inserting a CIK card with no relevant personal identification data stored thereon (it may contain other information, such as an indication that the card is valid for this network) into the reader 28 and by providing the user's personal identifier. The personal identifier may be provided in a conventional manner, such as by inserting the user's PIN at workstation 12 or having the user's prints verified. By using the workstation 12, the user, through the CPU 22, thereafter commands the LAN interface 18 to establish communications with the manager 30. The CPU 22 evaluates the CIK card to determine whether it contains user identification and, because the CIK card contains no user identification (recall that it was blank), instructs the KMM 24 to create a system key. A system key is desirably unique to each user and may be randomly generated. The CPU 22 combines the newly created system key and the user's personal identifier to create an authorization record that uniquely identifies the user.

The authorization record and system key are provided to the manager 30 in a secure communication. The KMM 24 provides a previously stored initialization key available only to the user's workstation and known to the manager 30 and instructs the crypto module 26 to encrypt the authorization record and system key. (Each workstation's initialization key may change in accordance with security requirements.) The encrypted authorization record is forwarded by the LAN interface 18 to the manager 30. The manager decrypts and evaluates the authorization record to ascertain whether the user is to be allowed to conduct secure operations on the network. The information that the manager uses to initially authenticate a user includes the user's personal identifier and the workstation's acceptance of the CIK card. Other authentication devices may also be used, although are not required. For example, a new user may only be authorized if the new user's request is accompanied by a validation of the request from a previously authorized user, such as the manager recognizing the previously authorized user's CIK card.

If the user is to be granted authority to conduct secure operation on the network, the manager 30 will store the authorization record and system key in its file on the user and instruct the KMM 24 to split the authorization record into two parts that are preferably randomly divided. One of the two parts is stored on the CIK card and the other part is stored in the KMM 24 of the user's home workstation. The user has thereby been granted authority to conduct secure operations from the user's home workstation, and as proof thereof has a CIK card with part of the user's authorization record stored thereon. The user may thereafter conduct secure operations using the procedures outlined below.

A secure session at the user's home workstation may be more clearly understood by separating the session into parts: home workstation verification, network manager verification, and the secure connection. To conduct secure operations from the user's home workstation, the user's home workstation initially verifies that the user is authorized access from this workstation. The user provides the user's personal identifier, inserts the CIK card into the reader 28, and issues commands through the workstation to perform the secure access procedure. The KMM 24 combines the portions of the authorization record from the CIK card and from KMM storage, evaluates whether the received personal identifier and the combined portions of the authorization record identify the user, and if the user is identified, validates that the user is authorized at this workstation.

If the user is authorized by the workstation 12, the KMM instructs the LAN interface to provide the user's authorization record to the network manager in an encrypted communication using the workstation's initialization key in the manner discussed above. The manager 30 decrypts and evaluates the authorization record to determine whether the user is authorized. The manager compares the received authorization record to the one stored in its files and, in the event the records match, authorizes the user.

If the user is authorized by the manager 30, the manager provides an operational key to the user's workstation in an encrypted communication using the workstation's initialization key. The operational key is used by the workstations 12 to conduct secure operations on the network. An operational key is provided to all users connected to the network, although the operational key may be changed periodically in accordance with security requirements. Different operational keys may be used at the same time to provide varying levels of security or to define different compartments of secure information.

The manager informs the user's SNAP 20 that the user may conduct secure operations on the network. Upon receipt of the verification that the user is authorized and of the encrypted operational key, the SNAP decrypts the encrypted operational key and verifies that the key is correct (e.g., using check sums, and other conventional techniques) and breaks the connection with the manager.

Secure operations on the network are conducted by using the operational key. The user's KMM loads the operational key and, in response to commands from the user on the workstation 12, establishes secure communication with other SNAP-equipped workstations in the network. Communications among workstations are encrypted and decrypted by the crypto module 26.

In the event the user wants to conduct secure operations on the network from a remote workstation that is not the user's home workstation (e.g., obtain secure information from the user's home workstation), the user may still employ his personal identifier and CIK card (recall that the CIK card includes part of the user's authorization record, but the other part is stored in the user's home workstation and not available to the remote workstation). The user provides the user's personal identifier, inserts the CIK card into the reader 28 of the remote workstation, and issues commands through the workstation to perform the secure access procedure. The KMM 24 attempts to combine the portions of the authorization record from the CIK card and from KMM storage, but is unable to do so because it does not have the other part of the authorization record in storage. The remote workstation KMM notes that the user is not authorized access from this workstation and passes further evaluation on to the manager.

Before passing the evaluation to the manager, the KMM creates a new system key and combines the new system key with the user's personal identifier to form a new authorization record. The SNAP provides the new authorization record and the personal identifier to the network manager in an encrypted communication using the remote workstation's initialization key.

The manager 30 then evaluates whether the user may conduct secure operations on the network. The manager evaluates the received authorization record and personal identifier as if the user where initially seeking authorization (see the initialization procedure above). If the user is validated by the manager, the manager 30 will return the user's authorization record and system key to the user's home workstation and instruct the KMM 24 at the remote workstation to split the authorization record into two parts. One of the parts is stored on the CIK card (in addition to the part of the authorization record from the home workstation) and the other part is stored in the remote workstation's KMM 24. The user has thereby been granted authorization to conduct secure operations from the remote workstation and, as proof, has a CIK card with part of the user's remote workstation authorization record stored thereon.

To conduct secure operations from the remote workstation, the user inserts the CIK card and personal identifier and establishes the secure connection in the manner discussed above.

In the event the personal identifier is unique to each user (and/or if security regulations permit) it can used instead of the combination of the system key and personal identifier discussed above. For example, and with reference to the discussion of the storage of the authentication record, a unique personal identifier may be the authentication record and may be split and stored on the CIK card and KMM as discussed above.

In a further embodiment, the manager 30 may also control the connections made among users. For example, after being granted access in the manner discussed above, the user may inform the manager that it wants to establish a secure connection with a second workstation. The manager provides a unique user key to the user's and second workstations so that the two workstations can establish secure communication that cannot be understood by other secure workstations. In yet a further embodiment, the two workstations can establish their own user key without the intervention of the manager.

In another embodiment the authorization record may be derived from the system key and the personal identifier. For example, a mathematical algorithm known to the workstations and the manager may be used to replace the combination of the system key and the personal identifier with an encrypted version.

In any event, once the secure connections have been established, data is passed from the workstation 12 to the user's SNAP where it is encrypted by crypto module 26 and fed to the LAN interface for transmission to the connected workstation. At the connected workstation the data are decrypted by the connected workstation's crypto module 26 and passed to the connected workstation.

Examples of sequences of actions taken in the operation of an embodiment of the invention are listed below. Example 1 is an initialization sequence, example 2 is a sequence of actions for a secure session at the user's home workstation, while example 3 is a secure session at a remote workstation. In the examples the following acronyms appear that describe conventional operations and/or processes:

GDK—Method of generating a key using data, such as a PIN, to initialize a mathematical process.

BIND—Two way mathematical process used to associate two data items, creating a record useable for authentication.

LIVE—Process for loading and processing an operational data set so that the data set can be used for session establishment.

IFF—Performing initial mathematical steps for session establishment.

RFF—Deriving session key from IFF data of workstation with whom communications are being established.

WRAP—Encryption of data.

RTV—Obtaining data stored in a KMM.

Key Handle—Logical storage address of a data item stored in a KMM.

| Action at Host | Action at SNAP | Result |
|---|---|---|
| 1) User decides to make a system key for secure network communications. User manually inserts CIK. Network access is needed so user issues CREATE_SYSTEM_KEY command with PIN # | | |
| | SNAP erases CIK SNAP allows CIK sense to reach SKMM | SKMM creates Local Session Key and returns handle |
| | SNAP stores user PIN # on SKMM | SKMM returns key handle |
| | SNAP issues GDK to SKMM using PIN and Session Local to get system key. | SKMM returns key handle |
| | SNAP issues BIND command for system key using PIN data, thus forming a relationship betwem the two. | SKMM returns key handle |
| | SNAP issues LIV to SKMM using system vector | SKMM returns key handle |
| | SNAP issues IFF to SKMM | SKMM returns key handles |
| | SNAP issues CONNECT.request to network manager node via LAN interface | SNAP waits until serviced |
| | SNAP retrieves IFF data from SKMM | SKMM returns data |
| | SNAP issues SECURE_CONNECT.req to network manager and passes data | Network accepts request, performs own IFF and returns data to SNAP |
| | SNAP passes data to SKMM and issues Rff | SKMM returns session key handle and data |
| | SNAP issues WRAP command for system key using SESSION key | SKMM returns key handle |
| | SNAP issues WRAP command for PIN # using SESSION key | SKMM returns key handle |
| | SNAP issues WRAP command for bind code using SESSION key | SKMM returns key handle |
| | SNAP issues RTV to skmm for wrapped system key | SKMM returns data |
| | SNAP issues RTV to skmm for wrapped Bind code | SKMM returns data |
| | SNAP issues RTV to skmm for wrapped PIN # | SKMM returns data |
| | SNAP issues REGISTER.req command to net manager accompanied by wrapped bind code, wrapped PIN #, and wrapped system key. | Net manager resolves same session key, unwraps system key, PIN, and Bind code. Verifies data, and enters into DB. Status of action is returned. |
| | SNAP issues replace command to SKMM with system key handle. | SKMM replaces session local key with system key, and updates CIK. |
| | SNAP issues RTV to skmm for Bind code | SKMM returns data |
| | SNAP copies users BIND code onto CIK after SKMM Data SNAP returns status to host | |
| 2) User decides to send mail message to another node. Net access is needed so an ACCESS_NET command is issued with PIN # | | |
| | User manually Inserts CIK | SKMM creates Local Session Key and returns handle |
| | SNAP stores user PIN # on SKMM | SKMM returns key handle |
| | SNAP stores user Bind Code on SKMM | SKMM returns key handle |
| | SNAP issues BIND command for system key using PIN data. | SKMM returns key handle |
| | SNAP issues coompare for stored Bind Code and calculated. SNAP rejects attempt if PIN # not correct. | SKMM returns result |

-continued

| Action at Host | Action at SNAP | Result |
| --- | --- | --- |
| User issues NET_XFER_INIT.request command | | |
| | SNAP issues LIV to SKMM using system vector | SKMM returns key handle |
| | SNAP issues IFF to SKMM | SKMM returns key handles |
| | SNAP issues CONNECT.request to network manager node via LAN interface | SNAP waits until serviced |
| | SNAP retrieves IFF data from SKMM | SKMM returns data |
| | SNAP issues SECURE_CONNECT.req to network manager and passes data | Network accepts request, performs own IFF and returns data to SNAP |
| | SNAP passes data to SKMM and issues RFF | SKMM returns session key handle and data |
| | SNAP issues COMM_SET.req command to net manager accompanied by wrapped pin and bind code. | Net manager resolves same session key, unwraps PIN #, and bind code, verifies PIN and bind code to authenticate user. Net manager wraps operational set in session key and returns to SNAP. |
| | SNAP issues unwrap command to SKMM with wrapped vector set handle. | SKMM returns key handle |
| | SNAP issues LIV to SKMM using oper. vector | SKMM returns key handle |
| | SNAP returns status to host of init process. | |
| User issues CONNECT.request command with end node address | | |
| | SNAP issues IFF to SKMM using oper. vector | SKMM returns key handles |
| | SNAP issues CONNECT.request to desired node via LAN interface | SNAP waits until serviced |
| | SNAP retrieves IFF data from SKMM | SKMM returns data |
| | SNAP issues SECURE_XFER.req to node and passes data | Network node accepts request, performs own IFF and returns data to orig. node, performs rff, loads crypto and waits for data. |
| | SNAP passes data to SKMM and issues RFF | SKMM returns session user key handle and data |
| | SNAP issues CRYPTO FILL command to encryption device | Crypto looks for data |
| | SNAP issues XFR command to SKMM to load crypto with session user key | SKMM xfers key into crypto |
| | SNAP returns CONNECT.indication command to host application | |
| User passes application data out plain text serial port | | |
| | SNAP accepts data from crypto cipher port, buffers, and issues data to end node via LAN interface | Network node accepts data and passes into crypto cipher port |
| | SNAP issues SECURE_DISC.req to node and terminates session. | Network node accepts request, terminates session, removes session data. |
| | SNAP returns status to host | |
| 3) User decides to send mail message to another node. From another site. Net access is needed so an ACCESS_NET command is issued with PIN # | | |
| | User manually Inserts CIK | SKMM cannot find split, returns invalid CIK error |
| | SNAP toggles CIK sense to | SKMM creates Local |

-continued

| Action at Host | Action at SNAP | Result |
| --- | --- | --- |
| | simulate new CIK insection. | Session Key and returns handle |
| | SNAP stores user PIN # on SKMK | SKMM returns key handle |
| | SNAP stores user Bind Code on SKKM | SKMM returns key handle |
| | SNAP issues LIV to SKMM using system vector | SKMM returns key handle |
| | SNAP issues IFF to SKMM | SKKM returns key handles |
| | SNAP issues CONNECT.request to network manager node via LAN interface | SNAP waits until serviced |
| | SNAP retrieves IFF data from SKMM | SKMM returns data |
| | SNAP issues SECURE_CONNECT.req to network manager and passes data | Network accepts request, performs own IFF and returns data to SNAP |
| | SNAP passes data to SKMM and Issues RFF | SKMM returns session key handle and data |
| | SNAP issues SYS_VAR.req command to net manager accompanied by wrapped pin # and bind code off CIK | Net manager resolves same session key, unwraps PIN and bind code, verifies PIN and bind code to authenticate user. Net manager wraps system key in session key and returns to SNAP. |
| | SNAP issues unwrap command to SKMM with wrapped key handle. | SKMM returns key handle |
| | SNAP issues replace command to SKMM with system key handle | |
| | SNAP returns status to host | |
| User issues NET_XFER_INIT.request command | | |
| | SNAP issues LIV to SKMM using system vector | SKMM returns key handle |
| | SNAP issues IFF to SKMM | SKMM returns key handles |
| | SNAP issues CONNECT.request to network manager node via LAN interface | SNAP waits until serviced |
| | SNAP retrieves IFF data from SKMM | SKMM returns data |
| | SNAP issues SECURE_CONNECT.req to network manager and passes data | Network accepts request, performs own IFF and returns data to SNAP |
| | SNAP passes data to SKMM and issues RFF | SKMM returns session key handle and data |
| | SNAP issues COMM_SET.req command to net manager accompanied by wrapped pin and bind code off CIK | Net manager resolves same session key, unwraps PIN #, verifies PIN and bind code to authenticate user. Net manager wraps operational set in session key and returns to SNAP. |
| | SNAP issues unwrap command to SKMM with wrapped vector set handle. | SKMM returns key handle |
| | SNAP issues LIV to SKMM using oper. vector | SKMM returns key handle |
| | SNAP returns status to host | |
| User issues CONNECT.request command with end node address | | |
| | SNAP issues IFF to SKMM using oper. vector | SKMM returns key handles |
| | SNAP issues CONNECT.request to desired node via LAN interface | SNAP waits until serviced |
| | SNAP retrieves IFF data from SKMM | SKMM returns data |
| | SNAP issues SECURE_XFER.req | Network node accepts request, |

| Action at Host | Action at SNAP | Result |
| --- | --- | --- |
| | to node and passes data | performs own IFF and returns data to orig. node, performs rff, loads crypto and waits for data. |
| | SNAP passes data to SKMM and issues RFF | SKMM returns session user key handle and data |
| | SNAP issues CRYPTO FILL command to encryption device | Crypto looks for data |
| | SNAP issues XFR command to SKMM to load crypto with session user key | SKMM xfers key into crypto |
| | SNAP returns CONNECT.indication command to host application | |
| User passes application data out plain text serial port | | |
| | SNAP accepts data from crypto cipher port, buffers, and issues data to end node via LAN intertace | Network node accepts data and passes into crypto cipher port |
| | SNAP issues SECURE_DISC.req to node and terminates session. | Network node accepts request, terminates session, removes session data. |
| | SNAP returns status to host | |

While preferred embodiments of the present invention have been described, it is to be understood that the embodiments described are illustrative only and the scope of the invention is to be defined solely by the appended claims when accorded a full range of equivalence, many variations and modifications naturally occurring to those skilled in the art from a perusal hereof.

What is claimed is:

1. A method of conducting secure operations on an uncontrolled network of computer workstations that has a network manager for authorizing conduct of secure operations on the network and plural secure computer workstations, each for communicating with the network manager and with other workstations in the network, the method comprising the steps of:

establishing a personal identifier for a first authorized network user;

providing the first authorized user with a cryptographic ignition key (CIK) card that contains an electronically readable, randomly selected portion of an authorization record, wherein the authorization record is a combination of the personal identifier and a system key created by a first workstation;

providing each of the secure workstations with a secure network access port (SNAP) that includes,
a reader for reading the CIK card, and
means for storing the portion of the system key not stored on the CIK card and for storing a workstation-unique initialization key for enabling encrypted communication with the network manager but not with other secure workstations in the network;

storing the complete authorization record and system key for the first authorized user in the network manager;

requesting access to the network from the first workstation by providing the first authorized user's personal identifier to the SNAP of the first workstation and reading the first authorized user's CIK card at the reader of the first workstation;

evaluating at the SNAP of the first workstation whether the received personal identifier and portions of the system key from the CIK card and from the SNAP identify the first authorized user, and if the first authorized user is identified, providing the authorization record and system key of the first authorized user to the network manager in an encrypted communication from the first workstation using the first workstation's initialization key for validation that the first authorized user is to be given access to the network; and in the event the first authorized user is validated by the network manager, providing an operational key from the network manager to the SNAP of the first workstation using the first workstation's initialization key, wherein the operational key enables secure operations from the first workstation on the network.

2. The method of claim 1 wherein the first authorized user is authorized to conduct secure operations on the network from a second workstation by the method further comprising the steps of:

requesting access to the network from the second workstation by providing the first authorized user's personal identifier to the SNAP of the second workstation and reading the first authorized user's CIK card at the reader of the second workstation;

recognizing at the second workstation that the first authorized user is not authorized access to the network from the second workstation;

assigning at the SNAP of the second workstation a second system key for the first authorized user;

providing the first authorized user's authorization record, personal identifier and second system key to the network manager in an encrypted communication from the second workstation using the second workstation's initialization key for determination whether the first authorized user is to be given access to the network;

in the event the network manager determines that the first authorized user is to be given access to the network, providing an operational key from the network manager to the SNAP of the second workstation using the second workstation's initialization key, wherein the operational key enable secure operations from the second workstation to the network; and storing a randomly selected portion of the second system key in the first authorized user's CIK card and the remainder of the second system key in the SNAP of the second workstation.

3. A method of conducting secure operations on an uncontrolled network of workstations that has a network manager for authorizing conduct of secure operations on the network, the method comprising the steps of:

providing each authorized user with a portable recording device that contains an electronically readable portion of an authorization record, wherein the authorization record includes a personal identifier for the user;

storing at a first workstation the portion of the authorization record not stored on the recording device and providing the first workstation with means for reading the recording device; and storing the entire authorization record at the network manager, wherein the authorization of the user to conduct secure operations on the network is validated at the first workstation and at the manager by evaluating the combined portions of the authentication record.

4. The method of claim 3 wherein the authorization record further includes a system key created by the first workstation, and wherein the combination of the personal identifier and the system key is user unique.

5. The method of claim 3 wherein the personal identifier is user unique and the authorization record includes only the personal identifier.

6. The method of claim 3 wherein the authorization record is encrypted before being stored.

7. The method of claim 3 wherein the authorization record of a user is provided to the network manager in an encrypted communication from the first workstation using an initialization key known to the first workstation and the manager.

8. The method of claim 7 where in the event the user is validated by the network manager, an operational key is provided from the network manager to the first workstation using the first workstation's initialization key, the operational key enabling secure operations on the network.

9. The method of claim 3 wherein the user may be authorized to conduct secure operations on the network from a second workstation by the method further comprising the steps of:

storing on the recording device a portion of a second authorization record, wherein the second authorization record includes the personal identifier of the user;

storing at the second workstation the portion of the second authorization record not stored on the recording device; and storing the entire second authorization record at the network manager.

10. The method of claim 9 wherein the second authorization record further includes a second system key created by the second workstation.

11. A method of conducting secure operations on an uncontrolled network of plural workstations that has a network manager for authorizing conduct of secure operations on the network, the method comprising the steps of:

(a) providing each authorized user with a portable recording device that contains, for each of plural first workstations at which the user is authorized, an electronically readable portion of an authorization record, wherein the authorization record includes a personal identifier for the user and a different key for each of the plural first workstations;

(b) storing at each of the plural first workstations the portion of the respective authorization record not stored on the recording device; and (c) storing the entire authorization record for each of the plural first workstations at the network manager, wherein the authorization of the user to conduct secure operations on the network is validated at each of the plural first workstations and at the manager by evaluating the combined portions of the respective authentication record.

* * * * *

UNITED STATES PATENT AND TRADEMARK OFFICE
CERTIFICATE OF CORRECTION

PATENT NO. : 5,548,721
DATED : Aug. 20, 1996
INVENTOR(S) : David L. Denslow

It is certified that error appears in the above-indentified patent and that said Letters Patent is hereby corrected as shown below:

Claim 3, line 22, change "authentication" to --authorization--

Claim 11, lines 38-39, change "authentication" to --authorization--

Signed and Sealed this

Eighteenth Day of February, 1997

Attest:

BRUCE LEHMAN

Attesting Officer

Commissioner of Patents and Trademarks